Oct. 7, 1941.  S. CHUMA  2,258,133
SAFETY MEANS
Filed Dec. 9, 1939
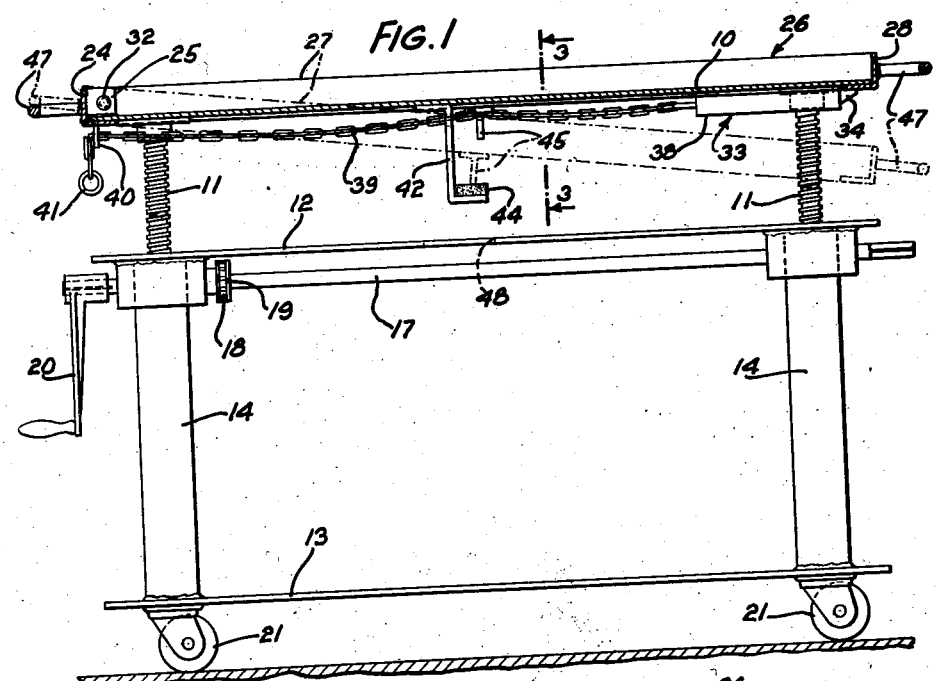
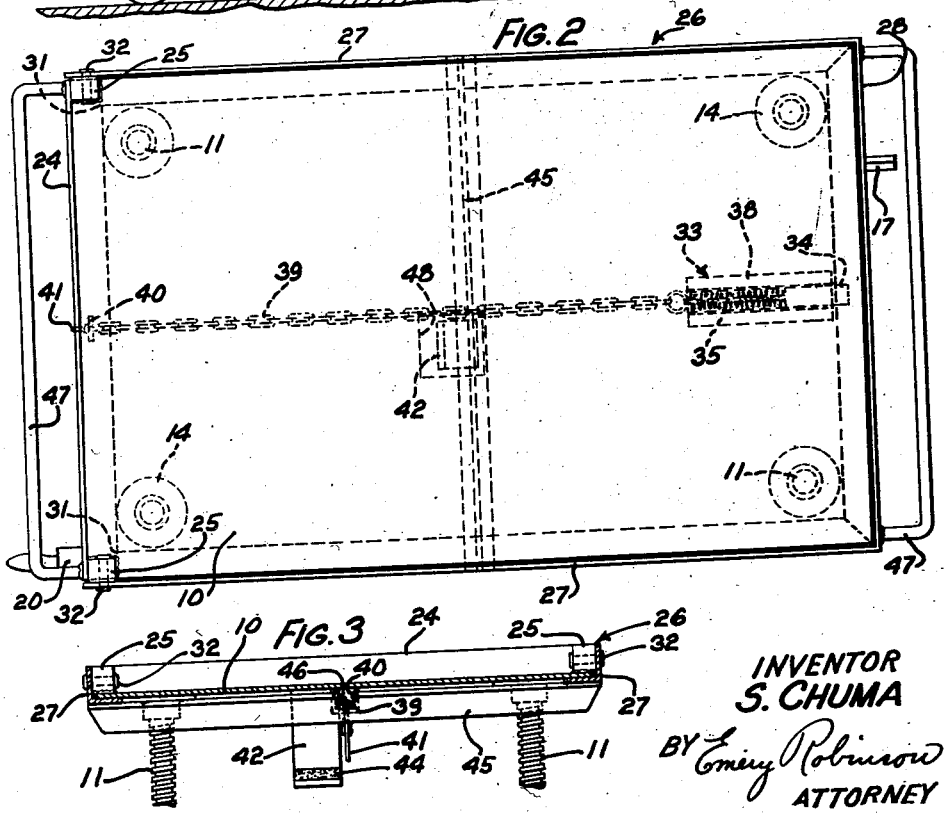
INVENTOR
S. CHUMA
BY Emery Robinson
ATTORNEY Patented Oct. 7, 1941

2,258,133

UNITED STATES PATENT OFFICE 2,258,133

SAFETY MEANS

Steven Chuma, Chicago, Ill., assignor to Western Electric Company, Incorporated, New York, N. Y., a corporation of New York Application December 9, 1939, Serial No. 308,436

7 Claims. (Cl. 211—126)

This invention relates to safety means and particularly to means for preventing objects from falling from carrier table tops while being transported.

Heavy tools, dies, machine parts and the like are commonly transported from place to place by movable elevator transportation tables which are wheeled to the machine, adjusted for height, and the tool, die or the like manually slid on the smooth flat carrier top. The table is then carefully wheeled from the machine to prevent the tool, die or the like from falling from the smooth unprotected top causing damage thereto. Moreover, the object is often jarred from the top causing injury to the operator.

An object of this invention is to overcome these objectionable features in the transportation of heavy objects and to provide a quick and efficient safety means which will save time in transportation, damage to the object and injury to the operator without complicating in any way the common method of using the transportation table.

A further object of the invention is to provide new safety means in simple form for use with an elevating transportation table already in use.

In attaining these objects, an adjustable pivoted guard is provided on the table which in guarding position forms a barrier around the greater portion of the periphery of the table top. This guard is easily dropped from guarding position upon actuation of spring pressed latch mechanism carried on the bottom face of the table top and normally engaging the guard to retain it in guarding position. To actuate the latch mechanism to permit the guard to drop, a chain connected to the latch mechanism is pulled whereupon the guard drops by gravity and against a stop member carried by the table top.

Other objects and advantages of the invention will be understood by referring to the following specification and accompanying drawing, in which Fig. 1 is a side view of a movable elevator transportation table with a safety guard embodying the features of this invention shown partly in section, the position of the guard when in an unguarding position being shown in broken outline;

Fig. 2 is a top plan view of Fig. 1, and

Fig. 3 is a vertical cross-section taken on the line 3—3 of Fig. 1.

In the drawing, the usual simple form of movable elevator transportation table is shown by way of illustration with a safety guard embodying the features of this invention applied thereto. The table includes a rectangular shaped table top comprising a flat steel plate 10 which has non-rotatably attached to its lower face at each corner a screw 11. For supporting the top 10 a table frame is provided comprising upper and lower steel plates 12 and 13 rigidly secured together by steel tubes 14, one at each corner of the table, the tubes being axially aligned with the screws 11, which freely extend through aperatures (not shown) formed in the upper frame plate 12 and into the tubes 14, the screws being suitably mounted and guided for vertical movement in the tubes. Rotatably journaled upon opposite sides of the table frame are shafts 17, only one of which is shown in Fig. 1, each shaft carrying a pair of worm gears (not shown), which are arranged to mesh with the screws 11. The shafts 17 are operatively interconnected for simultaneous rotation in either direction upon rotation of either shaft by means of sprockets 18 fixed to the shafts and a chain 19, one of the sprockets being shown in Fig. 1. The shafts 17 at opposite ends of the table frame project therefrom and are shaped to have an operating crank 20 connected thereto. By rotating the crank 20 in one direction the table top 10 with the attached screws 11 may be elevated while a rotation in the opposite direction will affect a lowering thereof. To permit the movable elevating table to be readily moved from place to place it is supported upon casters or rollers 21 secured to the lower frame plate 13 adjacent each corner thereof.

The table top plate 10 at one end is provided with a fixed guard rail 24 formed from structural angle iron of L-shaped cross-section which extends across the entire width of the plate with the horizontal arm of the angle iron rail welded or otherwise suitably secured to the bottom surface of the plate 10 and the vertical arm of the angle iron rail abutting the end edge of the plate and extending above the upper surface thereof. Secured, for example, by welding to the upper surface of the plate 10 at opposite corners thereof and abutting the vertical arm of the angle iron rail 24 and extending to the plane of the upper edge thereof are steel bearing blocks 25 which extend over the side edges of the plate for a suitable distance.

Pivoted to the bearing blocks 25 is a U-shaped guard rail, indicated in general at 26, comprising opposite side members 27 and an interconnecting web member 28 formed, in the present instance, of lengths of structural angle iron of L-shaped cross-section, united by welding. The horizontal arms of the angle iron members 27 and the web 28 extend under the bottom surface of the plate 10 while the vertical arms of the members and web freely extend upwardly above the upper surface of the plate to the plane of the upper edge of the vertical arm of the guard rail 24. At their left ends, as viewed in Fig. 2, the horizontal arms of the angle iron side members 27 are cut away as indicated at 31, to clear the horizontal arm of the angle iron guard rail 24. The bearing blocks 25 and the vertical arms of the side members 27, which abut the bearing blocks, are apertured to receive pins 32 which serve to pivot the U-shaped guard rail to the table top plate 10.

Secured to the bottom surface of the table top plate 10 intermediate the sides and at the right end thereof, as viewed in Figs. 1 and 2, is a spring pressed latch 33. A slidable bolt 34 of the latch 33 is arranged to engage under the horizontal arm of the web 28 of the pivotal guard rail 26 and retain the same in guarding position, as shown in the drawing in full lines. A compression spring 35 (Fig. 2) enclosed within a housing 38 of the latch 33 is operatively associated with the bolt 34 in a manner which serves to normally position the outer end thereof in latching relation under the pivotal guard rail 26. To withdraw the bolt 34 and thereby unlatch the guard rail 26 the bolt has attached to its left end (Figs. 1 and 2) a chain 39 which extends through a U-shaped member 40 attached to the bottom surface of the fixed guard rail 24 at the left end of the table top plate 10, as viewed in Figs. 1 and 2, the free end of the chain having a ring 41 attached thereto to facilitate the withdrawal of the bolt. Secured to the bottom surface of the table top plate 10 a one side of the chain 39 is a stop member 42 carrying a rubber bumper 44. The stop member 42 is arranged in the path of a bar 45 of structural iron having a T-shaped cross-section secured at opposite ends by welding, for example, to the bottom surfaces of the spaced horizontal arms of the angle iron side members 27 of the pivotal guard rail 26. A notch 46 is formed in the bar 45 for the movement of the chain 39. To facilitate pushing or pulling the table in wheeling it about handles 47 are attached to the fixed and pivotal guard rails 24 and 26, respectively, at opposite ends of the table.

A movable elevator table or carrier of the disclosed type equipped with the latchable guard rail 26 embodying the features of this invention is particularly useful in transporting heavy dies or other heavy machine tools to or from punch presses or other machines in a shop. In using the table so equipped, the table may be wheeled alongside a press, for example, and the flat table top 10 elevated or lowered, as the case may be, to the correct height for receiving the tool from the press by rotating the crank 20 in the manner previously described. The tool may then be slid off the press onto the forward end of the table top. It is to be understood that previous to the sliding of the tool from the press onto the table top 10 the pivotal guard rail 26 is permitted to swing downwardly by gravity to the dotted outline position thereof, as shown in Fig. 1, by a withdrawal of the spring pressed latch bolt 34 from latching relation with the guard rail by a pull on the chain 39, the bar 45 carried by the guard rail engaging the rubber bumper 44 of the stop member 42. It will be observed referring to the lowered position of the pivotal guard rail 26, shown in dotted outlines Fig. 1, that the stop member 42 prevents the guard rail in swinging downwardly from its guarding position to its unguarding position from engaging the screws 11, thus preventing damage thereto. In order to permit the table top 10 to be lowered a maximum distance the upper plate 12 of the table frame is provided with an aperture 48 arranged for the passage of the stop member 42 carried by the table top 10. After the tool has been slid onto the table top, the pivotal guard rail 26 is swung upwardly into guarding position, the latch bolt 34 catching under the guard rail and being retained thereat by the spring 35. The pivotal guard rail 26 with the fixed guard rail 24 thus provide a retaining rail or wall extending completely around or encircling the table top. The table with the tool thereon may then be wheeled around the shop for repairs or to storage without the liability of the tool sliding off the flat table top 10. Without the guard rails the tool would be apt to be jarred sufficiently to cause it to creep and finally slide off the flat table top 10 during wheeling of the table when the casters or rollers 21 abruptly engage obstructions or door sills on the floor. After the table with the tool thereon is wheeled to the point in the shop where the tool is to be removed from the table the pivotal guard rail 26 is unlatched by a pull on the chain 39 and the spring pressed bolt 34 is withdrawn from its latched position with the guard rail and the latter moves by gravity to its lowered unguarding position whereupon the table top is free at its forward end for the sliding of the tool therefrom.

From the foregoing description, it will be apparent that a simple and practical guard for carrier tops is provided whereby objects supported on the table top are prevented from sliding therefrom during movement of the table.

It will be understood that the embodiment herein described is merely illustrative of the invention and one application thereof, the invention being limited only by the scope of the appended claims.

What is claimed is:

1. In an article carrier the combination with an article supporting member, of pivotal and fixed guard members jointly encircling the supporting member and projecting thereabove, means for pivoting the pivotal guard member on the supporting member, and a latch on the bottom surface of the supporting member latchable under the pivotal guard member to retain it in its guarding position.

2. In an article carrier the combination with an article supporting member, of pivotal and fixed guard members jointly encircling the supporting member and projecting thereabove, said fixed guard member being arranged at one side of the supporting member, means arranged adjacent opposite ends of the fixed guard member for pivoting the pivotal guard member on the supporting member, the pivotal guard member extending around the other sides of the supporting member, and movable means on the supporting member at the side thereof opposite the fixed guard member for engaging that portion of the pivotal guard member opposite the fixed guard member to retain the pivotal guard member in its guarding position.

3. In an article carrier the combination with an article supporting member, of pivotal and fixed guard members jointly encircling the supporting member and projecting thereabove, means for pivoting the pivotal guard member on the supporting member, a latch on the bottom surface of the supporting member, said latch including a member latchable under the pivotal guard member to retain it in a raised guarding position, and means attached to said latch member and extended to one side of the supporting member for withdrawing said latch member from under the pivotal guard member to permit the latter to swing downwardly about its pivot means by the action of gravity to an unguarding position.

4. In an article carrier the combination with an article supporting member, of pivotal and fixed guard angle members of L-shaped cross-section jointly encircling the supporting member, said fixed guard member having one angle arm thereof secured to the bottom surface of the supporting member at one side thereof and the other angle arm of the angle member projecting above the article supporting member, said pivotal guard member being of U-shaped formation and having parallel portions and an interconnecting portion extending around the other sides of the supporting member, one angle arm of each of said portions extending under the bottom surface of the supporting member and the other angle arm of each of said portions projecting thereabove, means for pivoting the pivotal guard member on the supporting member adjacent the fixed guard member, and movable means on the bottom surface of the supporting member for engaging under the angle arm of that portion of the pivotal guard opposite the fixed guard member to retain the pivotal guard in its guarding position.

5. In an article carrier the combination with an article supporting member, of pivotal and fixed guard members jointly encircling the supporting member and projecting thereabove, means for pivoting the pivotal guard member on the supporting member, a latch on the bottom surface of the supporting member, said latch including a spring pressed member latchable under the pivotal guard member to retain it in a raised guarding position, means attached to said latch member and extended to one side of the supporting member for withdrawing said spring pressed latch member from under the pivotal guard member to permit the latter to swing downwardly about its pivot means by the action of gravity to an unguarding position, and cooperating stop members on the supporting and pivotal guard members for limiting the downward movement of the pivotal guard member.

6. In a movable article carrier the combination with an article supporting member, of pivotal and fixed guard members jointly encircling the supporting member and projecting thereabove, said fixed guard member secured to and extending across one side of the supporting member, means for pivoting the pivotal guard member upon opposite sides of the supporting member adjacent the fixed guard member, and movable means on the supporting member and engageable with the pivotal guard member at a side of the supporting member opposite the fixed guard member for retaining the pivotal guard member in guarding position.

7. In a movable elevating table the combination with an article supporting top member of rectangular form, a fixed guard rail secured to one end of the top member and projecting thereabove, a U-shaped pivotal guard rail arranged outside of and extending along opposite side edges and the end edge opposite the fixed guard rail and projecting above the top member, means for pivoting opposite portions of the pivotal guard rail on the top member at points adjacent the fixed guard rail, and movable means on the top member for engaging the pivotal guard rail for retaining it in guarding position.

STEVEN CHUMA.